United States Patent [19]

Lin

[11] 4,434,118
[45] Feb. 28, 1984

[54] COMPACTING POLYCARBONATE AND COPOLY(CARBONATE/PHOSPHONATE) PARTICLES

[75] Inventor: Ruey Y. Lin, New City, N.Y.

[73] Assignee: Stauffer Chemical Company, Westport, Conn.

[21] Appl. No.: 400,827

[22] Filed: Jul. 22, 1982

Related U.S. Application Data

[63] Continuation of Ser. No. 219,567, Dec. 23, 1980, abandoned.

[51] Int. Cl.$^3$ ............................................. B01J 2/22
[52] U.S. Cl. ..................................... 264/109; 264/118
[58] Field of Search ............................... 264/109, 118

[56] References Cited

U.S. PATENT DOCUMENTS

| | | | |
|---|---|---|---|
| 3,758,655 | 9/1973 | Wienand | 264/118 |
| 4,165,978 | 8/1979 | Sanzenbacher et al. | 264/118 |
| 4,205,162 | 5/1980 | Herscovici | 528/499 |
| 4,248,819 | 2/1981 | Meyer et al. | 264/118 |

Primary Examiner—James R. Hall
Attorney, Agent, or Firm—Vivienne T. White

[57] ABSTRACT

Polycarbonate or copoly(carbonate/phosphonate) resins of low bulk density are compacted by mechanical pressure into easily handleable and processable mattes which can be used to produce pellets. Typically loose material with a bulk density less than about 0.1 g/cm$^3$ is compacted to a matte of material with a bulk density greater than about 1 g/cm$^3$.

7 Claims, No Drawings

COMPACTING POLYCARBONATE AND COPOLY(CARBONATE/PHOSPHONATE) PARTICLES

This is a continuation of application Ser. No. 219,567 filed Dec. 23, 1980 now abandoned.

This invention relates to compacting those polyesters which contain carbonic moieties and are known as polycarbonates. More particularly this invention relates to compacting copoly(carbonate/phosphonate) polymers.

Polycarbonate or copolycarbonate mattes or pellets having a bulk density of about 1.1 to 1.2 g/cc have great utility in the fields of plastic molding and extrusion to make load bearing components, insulators, sheets, film, and other shaped articles. Polycarbonate and copolycarbonate are among those synthetic resins known as engineering plastics because of their outstanding mechanical, thermal, and electrical properties. Fluffy, fibrous or particulate masses of polycarbonates or copolycarbonates having a bulk density of from about 0.01 g/cc to about 0.5 g/cc, however, present great problems in handling. Such masses dust readily, do not flow easily, are burdensome to transport and store, and have too low a bulk density to be utilized directly in injection molding and other processing equipment. Particles of low bulk density are more useful on an industrial scale when they are compacted into mattes and produce pellets of high bulk density, preferably higher than 1 g/cm$^3$.

Fibrous masses or powdered polycarbonate and copolycarbonate arise from various processes for producing these resins. For example, Herscovici disclosed in U.S. Pat. No. 4,205,162 a process for recovering fine particles of polyesters, including polycarbonate and copoly(carbonate/phosphonate) from their solutions by addition of the polymeric solution to hot water with agitation, followed by boiling off the solvent, and recovery of the finely divided product by filtration. British Pat. No. 1,283,335 mentions a purification process for polycarbonate resulting in a fine powder of extremely low bulk density obtained by spraying a polymeric solution of polycarbonate into a mist of boiling water with agitation up to 1800 rpm. Hitherto, there has been no satisfactory process for transforming low bulk density polycarbonate or copolycarbonate into more useful mattes or pellets of higher bulk density.

Watanabe, Narita, Takahashi, and Fukuoka disclosed in Japanese Patent 1971—37,424 a process of treating bisphenol A polycarbonate dissolved in methylene chloride at elevated temperature with warm water through a small orifice to produce the polycarbonate with a bulk density of 0.35 g/cc, said to be particles 1–3 mm in diameter.

Narita et al. in Japanese patent 1976—41,048 disclosed a process for concentrating solutions of polycarbonate in methylene chloride passing the gelatinous mass between counterrotating, heated rolls, bearing spiral blades to give a powder of 1700 um particle size, which was then pelletized by conventional means.

Etake, Enoke, and Azabu disclosed in Japanese patent 1971—31,468 a process for making a gel of bisphenol A polycarbonate from a solution and heating the gel under vacuum "to give porous granules convenient for handling".

Rawlings in British Pat. No. 1,283,335 of 1972 disclosed a process for making particles of bisphenol-A polycarbonate about 4–10 um in diameter with a bulk density of 0.21–0.27 g/cc by spraying downward into a stream of warm air and aerosol of "atomized" droplets of hot polymeric solution in methylene chloride, and then separating the powder from the gas.

Toyota and Tanaka disclosed in Japanese Patent 1972—41,421 a method for reducing the size of powdered bisphenol-A polycarbonate from about 1 mm to about 0.6 mm by kneading the starting material with a 12 percent solution in methylene chloride of the polymer, kneading the mix, and removing the solvent.

It is an object of the invention to provide a process for utilizing polycarbonates and copoly(carbonate/phosphonate) in fluffy, fibrous or loose, powdered form. A further object of the invention is to provide compacted mattes or pellets of polycarbonates and their copolymers. Still another object of the invention is to make mattes or pellets of compacted polycarbonate or copolycarbonate having a bulk density from about 0.5 to about 1.2 g/cc. An additional object of the invention is to utilize polycarbonate and copolycarbonate material initially of low bulk density directly in plastic shaping processes such as compression molding, injection, molding, extrusion, and the like.

SUMMARY OF THE INVENTION

Surprisingly we have found that fluffy fibers or loose powders of polycarbonate of copoly(carbonate/phosphonate) material with a bulk density less than about 0.1 g/cm$^3$ can be compacted under mechanical pressure into mattes at ambient temperature at a pressure between about 300 to 4000 atmospheres. The process of the invention can be carried out statically in a hydraulic press or dynamically between a pair of counterrotating rolls to make a matte of compacted polymer.

Mattes of compacted polycarbonate or copolymer consist essentially of compacted fibers or powder with a bulk density higher than about 0.9 g/cm$^3$. A matte of compacted polycarbonate or copolymer may be comminuted to chips, flakes, or pellets of various sizes from about 5 mm to about 50 mm. The chips, flakes, or pellets may be used directly or ground further for compression molding, injection molding, or other processing steps.

DETAILED DESCRIPTION OF THE INVENTION

Polycarbonate resins are a well-known type of engineering thermoplastic formed by condensation polymerization of a dihydric phenol, such as, bisphenol A, and a carbonate precursor, such as, phosgene. They are useful in the formation of molded and shaped articles having good impact resistance, strength, and electrical resistance. One may include an organophosphorus dihalide as a third major monomeric reactant in the reaction medium to form copoly(carbonate/phosphonate) compositions. In such compositions, the basic polycarbonate structure is modified by the presence of phosphonate structures derived from the organophosphorus dihalide reactant, and this phosphonate structure contributes to the flame retardance of the resulting polymer.

The term "dihydric phenol" encompasses those phenols useful in making polycarbonate resins. A representative listing of such phenols would include the following compounds: bisphenols, such as bis(4-hydroxyphenyl)methane, 2,2-bis(4-hydroxyphenyl)propane ("bisphenol A"), 2,2-bis(4-hydroxy-3-methylphenyl)propane, 4,4-bis(4-hydroxyphenyl)heptane, 2,2-bis(4-hydroxy-3,5-dichlorophenyl)propane ("tetrachlorobisphenol A"), 2,2-bis(4-hydroxy-3,5-dibromophenyl) propane, 1,1-bis-4-hydroxyphenyl cyclohexane, etc.; dihydric phenol ethers, such as bis(4-hydroxy phenyl) ether, bis(3,5-dichloro-4-hydroxylphenyl)ether, etc., dihydroxydiphenyls, such as p,p'-dihydroxydiphenyl, 3,3'-dichloro-4,4'-dihydroxydiphenyl, etc., dihydroxyaryl sulfones, such as bis(4-hydroxyphenyl)sulfone ("sulfonyldiphenol"), bis(3,5-dimethyl-4-hydroxyphenyl) sulfone, etc.; dihydroxyl benzenes, resorcinol, hydroquinone; halo- and alkyl-substituted dihydroxy benzenes, such as 1,4-dihydroxy-2-chlorobenzene, 1,4-dihydroxy-2,5-dichlorobenzene, 1,4-dihydroxy-3-methylbenzene, etc; and the dihydroxy diphenyl sulfoxides and sulfides, such as bis(4-hydroxyphenyl) sulfoxide, bis-(3,4-dibromo-4-hydroxyphenyl)sulfoxide; bis(4-hydroxyphenyl)sulfide, and bis-3,5-dibromo-4-hydroxyphenyl)sulfide, etc.

The term "carbonate precursor" encompasses those carbonate precursors conventionally used to form polycarbonate resins which can be either a carbonyl halide or a bishaloformate. The carbonyl halides include carbonyl chloride or phosgene (which is preferred), carbonyl bromide, and mixtures thereof. The bishaloformates of dihydric phenols (bis-chloroformates of hydroquinone, etc.) or glycols (bishaloformates of ethylene glycol, neopentyl glycol, polyethylene glycol, etc.) are representative of compounds of the type which can be used.

The term "organophosphorus dihalides" encompasses compounds of the formulae $RP(O)X_2$ and $RPX_2$, where R is independently $C_1-C_{12}$ alkyl, phenyl, and halo-substituted phenyl, and X is independently chlorine or bromine, Representative organophosphorus dihalides include benzene phosphorus oxydichloride and methyl phosphorus oxydichloride.

The preferred reaction for the condensation polymerization to form polycarbonates or copoly (carbonate/phosphonates) is conducted advantageously in an organic solvent medium in the presence of an acid acceptor in order to remove byproduct hydrochloride.

The preferred process for separation and purification of the polycarbonate or copolycarbonate is that of U.S. Pat. No. 4,205,162 wherein a solution of the polymer in an inert solvent, such as methylene chloride, chloroform or hexane, is sprayed into hot water at a temperature greater than the boiling point of the solvent with agitation. The solvent boils off due to the temperature of the hot water, and finely divided powder forms as a suspension in the water. The powdered polymer is then separated from the water, normally by filtration, and dried. The particle size and distribution of the powder is determined by the concentration of polymer in the solution, the nature of the solvent, the temperature of the water, and the other parameters of the reaction and purification. Oftentimes, particularly in commercial processes, fine particles or fibers are generated. Fine particles or fibers of polycarbonate or copolycarbonate flow poorly, cause handling problems due to dusting, storage problems due to large volume, and have too low a bulk density to be readily moldable.

The present invention is a process for compacting by mechanical pressure to provide polycarbonate or copolycarbonate of high enough bulk density to be used directly in commercial processing equipment. The compacted material flows easily, dusts much less, and can be employed directly in compression molding, injection molding, and other processing equipment for plastic resins.

The conversion from fine particles or fluffy fibers of polycarbonate and copolycarbonate with little utility to useful chips, flakes or pellets can be carried out in two steps: compaction and comminution.

Irrespective of the rate of application of pressure, which is determined by the type of apparatus employed, the actual pressure employed for the compaction step can vary from about 200 atmospheres to about 5000 atmospheres or higher. The preferred range in applied pressure for compaction is from about 300 atmospheres to about 4000 atmospheres. For a set of corrugated counterrotating rolls the preferred range of linear hydraulic force is from about 550 to about 6000 kg; the more preferred range is from 1000 to about 5000 kg/cm.

The size of the matte produced by compaction is determined by the apparatus employed. A laboratory compression mold plunger makes a circular tablet approximately 2.5 cm in diameter and approximately 20 mm thick.

A laboratory hydraulic press makes a sheet about 10 cm to 40 cm square. Commercial rolling presses are available to produce a matte, preferably corrugated, from about 6 cm to about 60 cm wide and about 25 mm to about 40 mm thick. The thickness in the case of the compression mold plunger and the hydraulic press is determined by the amount of fine powder charged. In the case of the rolling press, the thickness of the matte produced is determined by the rate of feed of fine powder into the nip between the rolls.

The bulk density of the fine feed to the compacting process of the present invention ranges from about 0.02 to about 0.75 g/cc. The bulk density of the compacted and comminuted product of the instant invention varies from about 0.9 g/cc to about 1.2 g/cc. For use as resin in further processing steps a bulk density of about 0.5 to about 1.2 g/cc is preferred.

The surface of the rolls or plates applying the mechanical force can be scored to give corrugated, patterned, or briquetted compacted product of any desired shape. Corrugations facilitate comminuting the compacted matte to smaller chips, flakes, or pieces.

The rolls used to produce compacted polycarbonate or copoly(carbonate/phosphate) continuously rotate at any speed from about 1 to about 100 rpm. Within this range about 7 to about 20 rpm is preferred to practice the process of the instant invention.

The invention can be carried out at ambient humidity and ambient temperature. The friction of performing the compaction step dynamically by means of rolls exerting mechanical pressure on the fine particles of polycarbonates increases the temperature of the polymer about 10° to about 30° C. There is no necessity to chill the pressure folls until the temperature increases to the point where discoloration of the compacted polycarbonate or copolycarbonate commences.

After thin mattes have been individually formed by compaction of fine powder in a hydraulic press at ambient temperature, they can be stacked up and compression molded at about 175° to about 275° C. to form strong sheets of useful, load-bearing thickness.

Preferably the comminution step is carried out in two steps: prebreaking and grinding. The compacted matte of polycarbonate or its copolymers can be broken up into flakes, chips, slices, or pieces by standard cutting machines. It is convenient to attach a rotating set of cutting knives just below the compacting chamber of a continuous rolling press so that the matte of compacted polymer is immediately broken up into pieces varying in size from about 5 mm to 50 mm. The speed of rotation of the prebreaking knives varies from about 40 to about 1000 rpm, thus determining the size of the pieces. In practicing the instant invention, a prebreaking step for the compacted polycarbonate or copoly(carbonate/phosphonate) is not required, however.

Grinding mills such as those manufactured by the Fitzpatrick Co., Elmhurst, Ill.; Pulverizing Machinery Co., Summit, N.J.; and Raymond Division of Combustion Engineering Co., Stamford, Conn., may be used to prepare the desired sized polycarbonate or its copolymers from compacted matte, flakes, or chips of that material. The particle size of the communited polymer is determined by a number of parameters in a grinding mill among which are the number of cutting knives, the shape of the cutting knives, the speed of rotation of the knives, the size of the screen employed, the shape of the holes in the screen, the type of feed throat, the pattern at which the blades are set, and the rate at which the feed is fed into the comminutor.

The usual comminutor is constructed within a cylindrical housing containing a rotor carrying sets of radial knives. The width of the preferred mill varies from about 15 to about 75 cm. The knives vary in a preferred mill from about 12 to about 80 in number extending from about 12 to about 25 cm in radius. The speed of rotation varies from about 800 to about 10,000 rpm. Rotating blades are either swinging or fixed to the rotor and are available in a variety of straight, curved, or stepped shapes. Preferred blades can have dull impact edges, which have a pulverizing function, or sharp cutting edges.

Comminuting blades may be assembled in various arrays. A preferred array has knife edges on one side and impact edges on the other. By changing the direction of rotation the degree of size reduction can be controlled. Blades can be mounted in aligned or precessing configuration. Screens may have round or square perforations, diagonal or straight slots, or be a wire mesh—all of varying size from about 15 mm to about 4 cm. For a given screen and a given set of knives the speed of rotation influences the amount of comminution. The higher the speed of the blade, the more elliptical a round screen hole appears to a particle, hence the smaller the resulting size.

The design and location of the throat feeding the compacted material into a mill influences the particle size and distribution of particle size of the polymeric product. The more vertical the inlet for the feed the fewer fines produced, other parameters holding constant, since the granule approaches the screen directly. The more horizontal the inlet for the feed, the finer the grind as more metal surface is presented for cutting and rebounding. Among the preferred throats for feeding are wide pans, angular throats, vertical throats, horizontal throats, vertical cones, and sigmoidal throats.

The constancy and rate of feed into a comminutor determines the residence time, all other factors held constant, hence the degree of milling and the narrowness of the particle size distribution.

The present invention is illustrated by, but not limited by, the following examples. Other alternatives can be employed but still are encompassed in the scope of the present invention.

EXAMPLE 1

This Example illustrates the preparation and composition of copoly(carbonate/phosphonate) polymeric materials.

By the processes disclosed in Example 2 of U.S. Pat. No. 4,205,162 three copoly(carbonate/phosphonate) polymers were prepared with the following compositions. All three had mole ratios of phosgene to benzene phosphonyl dichloride of 10:1.

90:10 mole ratio of bisphenol A/tetrachlorobisphenol A

75:25 mole ratio of bisphenol A/tetrachlorobisphenol A

50:50 mole ratio of bisphenol A/tetrachlorobisphenol A

EXAMPLE 2

This Example illustrates preliminary compaction experiments with a 2.5 cm diameter cylindrical mold to make a compacted disc.

A 50/50 mole percent copolymer prepared by the method disclosed in Example 1 was employed with about two grams charged for each measurement. The initial bulk density was 0.0214 g/cc. The sample was placed in the cylindrical mold, which in turn was placed between the unheated platens of a 20 cm by 20 cm hydraulic press (Pasadena Hydraulic Co., Pasadena, Calif.). Pressure was applied in about one second. The results are given below:

| Pressure (atmospheres) | Sample Size (g) | Bulk Density (g/cc) |
| --- | --- | --- |
| 435 | 2.16 | 0.508 |
| 609 | 2.21 | 0.769 |
| 870 | 2.14 | 0.852 |
| 1305 | 2.28 | 1.11 |
| 1741 | 2.13 | 1.12 |
| 2176 | 1.92 | 1.15 |
| 2611 | 1.87 | 1.15 |
| 3046 | 2.05 | 1.18 |
| 3481 | 2.11 | 1.18 |

EXAMPLE 3

This Example illustrates the use of a hydraulic press to make compacted sheets of copolycarbonate.

Three different powdered copolymers were each used to make two different size compacted sheets. Two steel molds were used one 6.25 cm by 6.25 cm by 0.15 cm thick, the other 15 cm by 15 cm by 0.15 cm thick. A 12-g charge of finely divided powder was used for the smaller mold. A 60-g charge for the larger mold. All nine sheets were made with the platens heated to 150° C.

The three finely divided copolymers contained respectively 90/10, 75/25, and 50/50 mole percent copoly(carbonate/phosphonate) prepared as in Example 1. In all cases the pressure was about 2000 atmospheres. Opaque sheets were produced with low tear strength but good cohesive strength.

EXAMPLE 4

This Example illustrates the use of a rolling mill to compact finely divided powder of copolycarbonate at various applied pressures.

The rolling mill employed contained two grooved rolls 3.75 cm wide and 20 cm in diameter counterrotating at 6.8 rpm at ambient temperature.

Particles of 50/50 copoly(carbonate/phosphonate) as made in Example 1, with a bulk density of 0.03 g/cc were fed into the nip of the rolls at about 175 kg/cm. Four linear hydraulic forces were applied 1125, 2250, 3395, and 4465 kg/cm. The compaction yield, that is the weight percentage of granules produced 0.5 mm or larger in size, varied from 88 percent for the two lower applied pressures to 95 percent for the two higher applied pressures. The compacted matte produced from the rolling mill was 3.75 cm wide and about 35 mm thick. In all four cases the compacted material had sufficient cohesive strength to be fed, after chipping, to standard plastic resin molding equipment.

EXAMPLE 5

This Example illustrates a two-step precompaction plus compaction method for transforming loose, fluffy polymer of low bulk density into easily handleable sheets which are then compacted into material appropriate for plastic processing operations.

Six sheets of 90/10 mole ratio copoly(carbonate/phosphonate) as prepared in Example 1 were precompacted from loose, fluffy, dusty, particles with a bulk density of 0.02 g/cc to opaque sheets of intermediate bulk density of about 0.5 g/cc, which were easily handleable, by the method of Example 3.

Then the platens of the same hydraulic press were increased in temperature to 220° C. and six layers of the 15 cm by 15 cm by 0.15 cm sheets of the preceeding paragraph were placed in the same mold and compacted at 2000 atmospheres pressure to a dense, transparent sheet 15 cm by 15 cm by 0.6 cm thick. The latter sheet had a bulk density of 1:25 g/cc and a Barcol hardness (ASTM D-2583) of 78.

Having illustrated the process of the present invention by typical but not limiting examples, the scope of the legal protection sought is delineated in the claims below.

I claim:

1. A process for producing a polycarbonate particulate product having increased bulk density suitable for plastic shaping comprising mechanically compacting particles of a polycarbonate resin having a bulk density of about 0.1 gm/cm$^3$ using a pressure of from about 100 to about 5000 atmospheres to produce a polycarbonate product having a bulk density of greater than about 0.9 g/cm$^3$.

2. The process as described in claim 1 wherein the polycarbonate is a copoly (carbonate/phosphonate).

3. The process of claim 1 further comprising comminuting the compacted polycarbonate to produce chips, flakes or pellets having increased bulk density.

4. The process of claim 1 wherein the particulate polycarbonate is compacted to produce a matte.

5. The process of claim 4 wherein said matte is comminuted to form pellets.

6. The process of claim 1 wherein the pressure utilized to compact the particulate polycarbonate is from about 300 to 4000 atmospheres.

7. The process of claim 1 followed by the additional step of compression molding at a temperature from about 175° to about 275° C.

* * * * *